March 3, 1959   N. H. SPINKS, JR   2,875,839
ENDLESS TRACK CONVERTIBLE CHASSIS

Filed Nov. 14, 1955   3 Sheets-Sheet 1

Newton H. Spinks, Jr.
INVENTOR.

BY *Lawrence A. O'Brien*
*and Harvey B. Jackson*
Attorneys

March 3, 1959  N. H. SPINKS, JR  2,875,839
ENDLESS TRACK CONVERTIBLE CHASSIS
Filed Nov. 14, 1955  3 Sheets-Sheet 2
Fig. 3
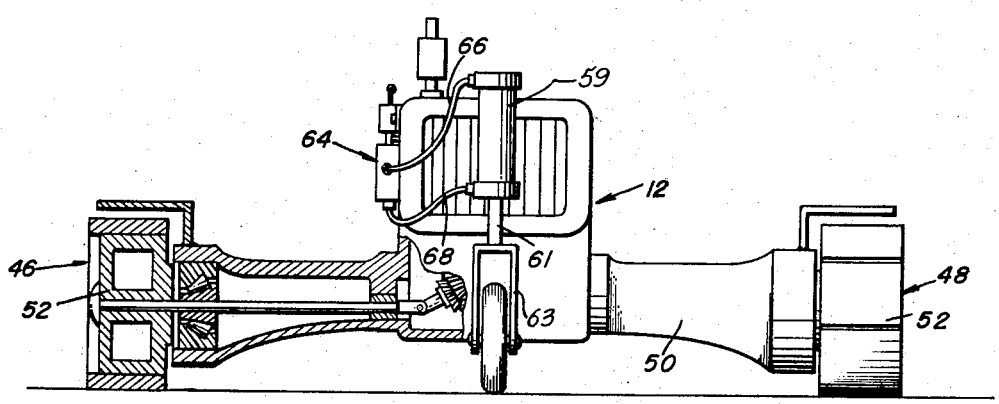
Fig. 4
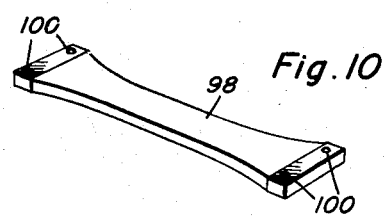
Fig. 10
Newton H. Spinks, Jr.
INVENTOR.
BY *Clarence A. O'Brien*
and *Harvey B. Jackson*
Attorneys March 3, 1959  N. H. SPINKS, JR  2,875,839
ENDLESS TRACK CONVERTIBLE CHASSIS
Filed Nov. 14, 1955  3 Sheets-Sheet 3

Newton H. Spinks, Jr.
INVENTOR.

United States Patent Office 2,875,839
Patented Mar. 3, 1959

2,875,839

ENDLESS TRACK CONVERTIBLE CHASSIS

Newton H. Spinks, Jr., North Clymer, N. Y.

Application November 14, 1955, Serial No. 546,490

5 Claims. (Cl. 180—9.1)

This invention relates generally to vehicle constructions and is more particularly concerned with a novel vehicular chassis which readily accommodates a vehicle body such as a manure wagon or the like thereon.

A further object of the invention in conformance with that set forth above is to provide a vehicle chassis of the character set forth which is motivated by endless track assemblies and which includes a transverse power train for driving the endless track assemblies wherein said transverse power train support a forwardly extending power plant.

A more specific object of the invention in conformance with that set forth above is to provide a U-shaped vehicular frame including extensible leg members removably supporting a vehicle body therebetween by means of a removable drawbar extending between the leg members and by means of lug elements secured on axle portions of the vehicle body wherein said lug elements are securable in oppositely disposed channel portions of said leg members.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged front elevational view of the novel vehicular chassis;

Figure 4 is a perspective view of the novel vehicular chassis showing the extensible leg members thereof;

Figure 10 is a perspective view of a counterbalancing weight member utilized for balancing the power plant of the vehicular chassis when the wagon body has been removed.

Figure 1:
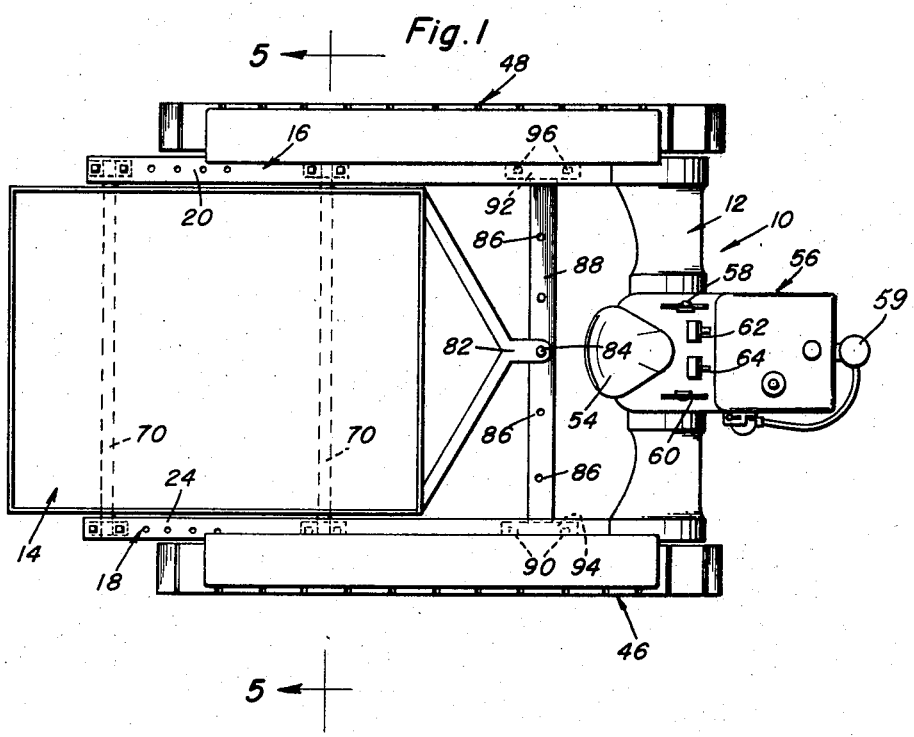
Figure 1 is a top plan view of the novel vehicular chassis showing a vehicle body secured in place thereon.
Figure 2:
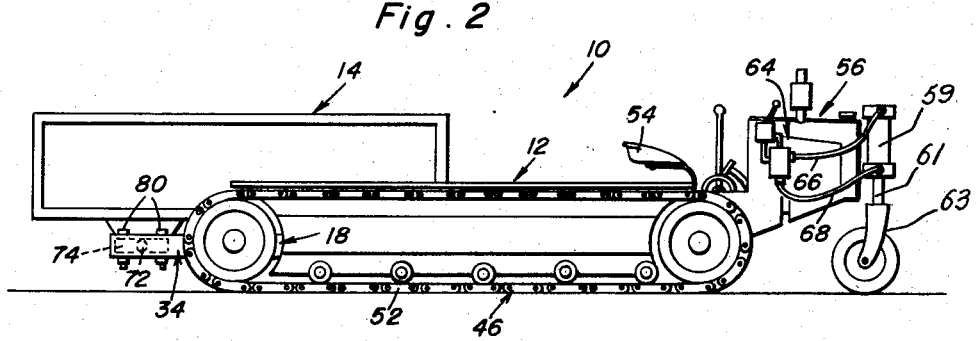
Figure 2 is a side elevational view of Figure 1.
Figure 7:
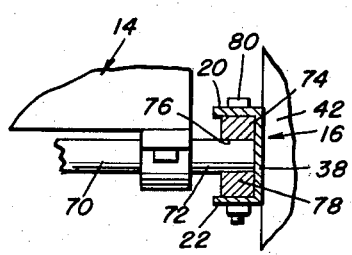
Figure 7 is an enlarged sectional view taken substantially on the line 7—7 of Figure 6.
Figure 5:
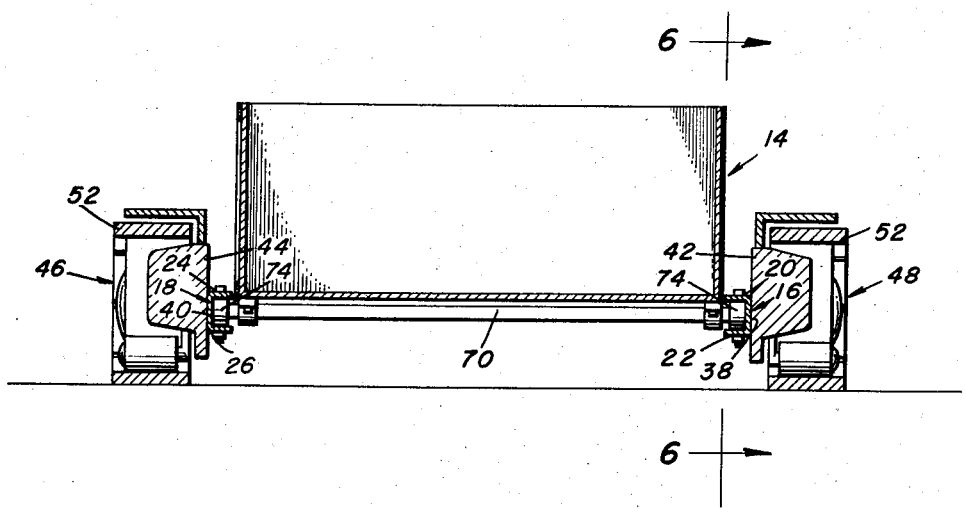
Figure 5 is a sectional view taken substantially on the line 5—5 of Figure 1.
Figure 6:
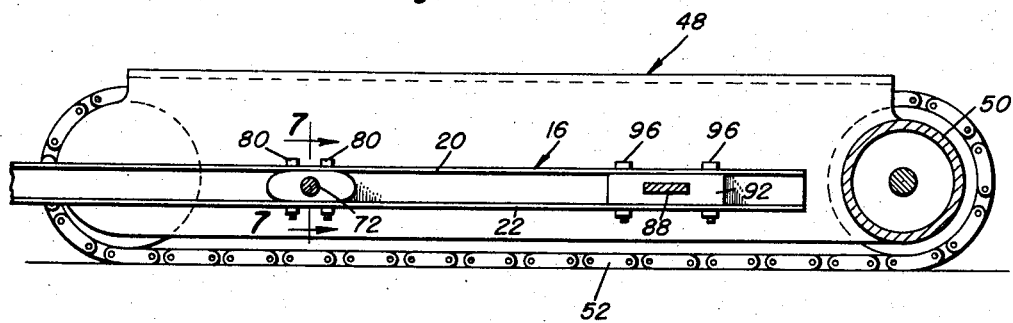
Figure 6 is a sectional view taken substantially on the line 6—6 of Figure 5.
Figure 8:
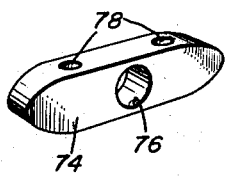
Figure 8 is an enlarged perspective view of one of the lug elements utilized in securing a vehicle body of the novel chassis.
Figure 9:
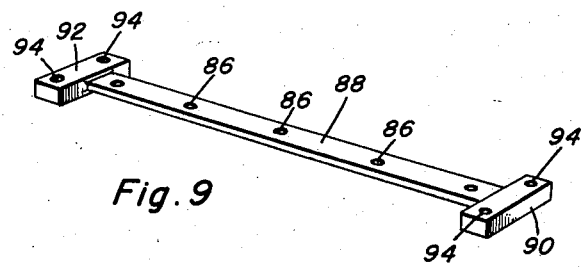
Figure 9 is a perspective view of a drawbar member utilized in securing a wagon body on the novel vehicular chassis.

Indicated generally at 10 is a vehicular chassis a substantially U-shaped frame 12 for supporting a vehicle body 14 which may be conventional manure spreader, forage wagon, etc.

The U-shaped frame 12 includes a pair of oppositely disposed leg members 16 and 18 which may be conveniently made from C-shaped channel members having upper and lower horizontally spaced flange portions 20 and 22, and 24 and 26, respectively. The flange portions 20 and 22, and 24 and 26 include a plurality of vertically aligned apertured portions 28 and 30, respectively.

As seen in Figure 4, suitable C-shaped channel members 32 and 34, having suitable vertically aligned apertures extending therethrough, are telescopically received within the leg members 16 and 18 being secured therein by means of suitable bolt assemblies 36 for providing an extension to the frame for accommodating vehicle bodies which are especially long.

The vertical flanges 38 and 40 of the leg members 16 and 18, respectively, are suitably secured to longitudinally extending flange portions 42 and 44 of endless track assemblies 46 and 48, respectively.

Each of the endless track assemblies 46 and 48 are suitably secured to a transversely disposed enclosed power train 50 of any suitable character, which drives suitably supported ground engaging endless tracks 52 in a conventional manner. The endless tracks 52 will accommodate the vehicular chassis for movement over relatively soft or recently plowed ground thus affording the desired mobility for manure spreaders, forage wagons and the like under relatively adverse conditions.

A power train housing supports seat 54, and has a forwardly extending power plant 56, the power train housing having conventional hand brakes 58 and 60, and clutches 62 and 64 for braking and driving the endless track assemblies 46 and 48 for steering the vehicular chassis. The power plant 56 has suitably secured on a central forward end portion thereof a vertically disposed double-acting hydraulic cylinder 59 having a hydraulically controlled extensible piston rod 61 extending therefrom, said piston rod supporting thereon a suitable ground engaging caster wheel assembly 63, said caster wheel assembly being raised in an elevated position when the vehicle body 14 is placed on the frame yet serving to prevent accidental forward tipping of the power plant and frame, and when the wagon body 14 is removed the caster wheel assembly 63 is lowered by means of a suitable control assembly 64 and hydraulic lines 66 and 68 for aiding in the transportation of the empty vehicular chassis.

The vehicle body 14 will include suitable transversely disposed and longitudinally spaced axles 70, which include laterally extending portions 72 that ordinarily supports wheels and from which the wheels are removed. A lug element 74 has its aperture 76 fitted over the portion 72 on each axle and on each element has a pair of spaced transverse apertured portions 78 alignable with the apertures 28 and 30 of the leg members 16 and 18, which will accommodate therethrough suitable fastening bolt assemblies 80. The vehicle body 14 may include a suitable forwardly extending tongue element 82 being suitably apertured at 84, said apertured portion 84 of the tongue being secured and alignable with one of the apertures 86 of an elongated drawbar member 88 which includes transverse securing ends 90 and 92 having suitable apertures 94 for accommodating fastening bolts 96 therethrough and aligned with the spaced apertures 28 and 30 of the leg members of the frame.

As seen in Figure 10 there is provided an elongated weight member 98 which includes transversely disposed apertured portions 100 at the opposite ends thereof, said weight member being disposable between the flanges of the leg members 16 and 18 when the vehicle body 14 is removed for counter-balancing the weight of the power plant 56.

Various positional directional terms such as "front," "rear," etc. are utilized here and have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a convertible vehicle chassis comprising a rearwardly opening U-shaped frame, said frame including a pair of oppositely disposed longitudinal leg members, each of said leg members including channel portions opening toward each other, a removable vehicle body, a pair of axles carried by said body and having portions which normally accommodate wheels, means longitudinally adjustably disposed in said channel portions and connected to said axle portions for removably mounting the vehicle body between said leg members, said U-shaped frame including an enclosed power train extending transversely between adjacent forward ends of said leg members, longitudinally disposed ground engaging endless track assemblies operatively secured to said power train, and a power plant operatively connected to an intermediate portion of said power train and extending away from said leg members.

2. In combination as set forth in claim 1 wherein said channel portions of said leg members have pairs of vertically spaced longitudinally apertured flange elements, said vehicle body mounting means including a drawbar member including apertured end portions detachably secured between opposite channel portions of said leg members, said drawbar member being detachably secured to a forward portion of said vehicle body, the lateral axle portions of said vehicle body each having a lug element thereon, said elements including transverse apertured portions alignable with the apertured portions in said flange elements.

3. In combination as set forth in claim 1 wherein said leg members each include a longitudinally extendable leg portion telescopically secured within the channel portion of each leg member.

4. A convertible vehicular chassis comprising a rearwardly opening U-shaped frame, said frame including a pair of oppositely disposed longitudinal leg members, each of said leg members including channel portions opening toward each other, means in said channel portions for removably mounting a vehicle body between said leg members, said U-shaped frame including an enclosed power train extending transversely between adjacent forward ends of said leg members, longitudinally disposed ground engaging endless track assemblies operatively secured to said power train, a power plant operatively connected to an intermediate portion of said power train and extending away from said leg members, said channel portions of said leg members comprising pairs of vertically spaced longitudinally apertured flange elements, said vehicle body mounting means including a drawbar member having apertured end portions detachably secured between opposite channel portions of said leg members, a drawbar member including means for detachable securement to the forward portion of a vehicle body, said body having lateral axle portions, and a plurality of lug elements securable on the ends of the lateral axle portions of the vehicle body, said lug elements including transverse bore portions alignable with the apertured portions of the flange elements.

5. A convertible vehicular chassis comprising a rearwardly opening U-shaped frame, said frame including a pair of oppositely disposed longitudinal leg members, each of said leg members including channel portions opening toward each other, means in said channel portions for removably mounting a vehicle body between said leg members, said U-shaped frame including an enclosed power train extending transversely between adjacent forward ends of said leg members, longitudinally disposed ground engaging endless track assemblies operatively secured to said power train, a power plant operatively connected to an intermediate portion of said power train and extending away from said leg members, and said leg members each including a longitudinally extendable leg portion telescopically secured within the channel portion of each leg member.

References Cited in the file of this patent

UNITED STATES PATENTS

| | | |
|---|---|---|
| 946,627 | Wartchow | Jan. 18, 1910 |
| 1,250,677 | Shannon | Dec. 18, 1917 |
| 1,621,275 | Reeves | Mar. 15, 1927 |
| 1,803,866 | Patterson | May 5, 1931 |
| 1,903,968 | Hosmer | Apr. 18, 1933 |
| 2,048,580 | Webber | July 21, 1936 |
| 2,129,340 | Webber | Sept. 6, 1938 |
| 2,583,358 | Cesan | Jan. 22, 1952 |
| 2,620,041 | Chenette et al. | Dec. 2, 1952 |
| 2,701,728 | Miller | Feb. 8, 1955 |